Nov. 3, 1964  R. R. RICHOLT  3,155,347
TAB CONTROL MECHANISM INCLUDING AUTOMATIC MEANS
FOR REVERSION TO MANUAL CONTROL
Filed Nov. 26, 1963  6 Sheets-Sheet 1

INVENTOR.
ROBERT R. RICHOLT
BY
*L. E. Carnahan*
AGENT

Nov. 3, 1964  R. R. RICHOLT  3,155,347
TAB CONTROL MECHANISM INCLUDING AUTOMATIC MEANS
FOR REVERSION TO MANUAL CONTROL
Filed Nov. 26, 1963  6 Sheets-Sheet 5

INVENTOR.
ROBERT R. RICHOLT
BY
AGENT

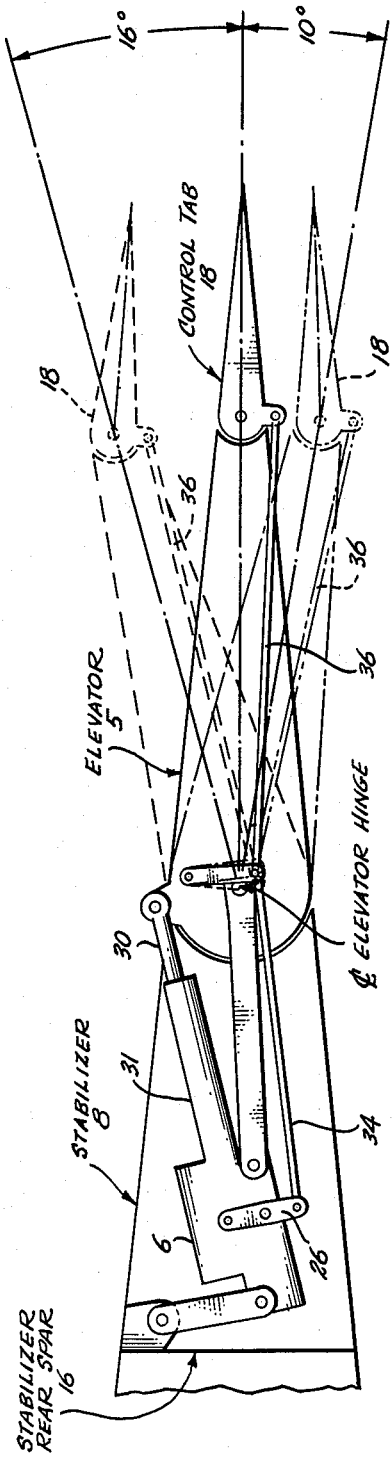

United States Patent Office 3,155,347
Patented Nov. 3, 1964

3,155,347
TAB CONTROL MECHANISM INCLUDING AUTOMATIC MEANS FOR REVERSION TO MANUAL CONTROL
Robert R. Richolt, Issaquah, Wash., assignor to The Boeing Company, Seattle, Wash., a corporation of Delaware
Filed Nov. 26, 1963, Ser. No. 326,087
13 Claims. (Cl. 244—83)

This invention relates to aircraft control devices and more particularly to tab actuating mechanisms for automatically controlling a trailing tab with respect to a movable control surface with which it is associated, and which includes means to achieve automatic reversion to manual control upon failure of the power control system.

Various systems and mechanisms have been introduced for operating and controlling the tabs or flaps mounted at the trailing edges of control airfoils such as elevators, rudders and ailerons. The prior mechanisms have been such that the tabs may be set or operated by the pilot during flight and in other devices the tab has been actuated to act within as a servo means to assist in the control of the principal control airfoil or as an anti-servo means. However, no known prior art tab actuating mechanisms provide for locking the tab out of action when operating on power and utilizing the tab only for manual reversion upon failure of the power system.

Therefore, it is an object of this invention to provide an aircraft tab control mechanism.

A further object of the invention is to provide an aircraft tab control mechanism including means for reversion to manual control.

A still further object of the invention is to provide a tab control mechanism which locks the tab out of action during the power mode of operation and which utilizes the tab only for manual reversion upon failure of the power mode.

Another object of the invention is to provide a tab control mechanism which utilizes a differential lever means and hydraulic locking means on the lever pivot to achieve automatic reversion to manual control upon pressure failure of the associated hydraulic power means.

Another object of the invention is to provide a control mechanism for a trailing tab or flap mounted with respect to a movable control surface which includes a power control system having a plurality of power sources and wherein said tab or flap is locked out of action except upon failures of the power control system.

Another object of the invention is to provide a control mechanism for a trailing tab or flap mounted with respect to a movable control surface which functions upon failure of the associated power control system to assist the manual movement of the control surface.

Another object of the invention is to provide a tab lock mechanism which is locked against rotation by hydraulic pressure and releases to permit tab displacement by manual command upon hydraulic pressure failure.

Other objects of the invention not specifically set forth above will become readily apparent from the following description and drawings in which:

FIG. 5 is a diagrammatic view showing an elevator and control tab travel of an aircraft utilizing the tab control mechanism of the invention with the power on; and FIG. 6 is a diagrammatic showing of an elevator and control tab travel of an aircraft utilizing the tab control mechanism of the invention with the power off.

Figure 1:
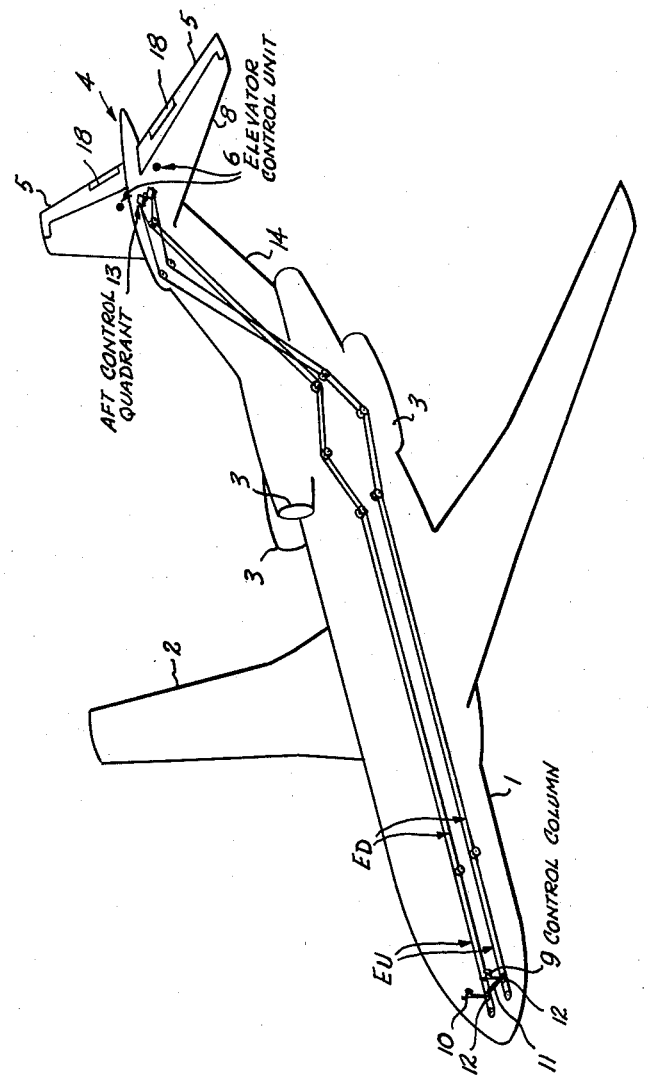
FIG. 1 is a schematic view showing an aircraft elevator control system.

Referring now to FIG. 1 which shows an aircraft comprising a fuselage 1, wings 2, a plurality of jet engines 3, and a tail section generally indicated at 4. Tail section 4 is provided with a pair of elevators 5 which provide the primary control of the aircraft about its lateral axis. Elevators 5 are normally actuated in response to control system inputs, by hydraulic power via elevator control units indicated generally at 6 (see FIG. 2). Each elevator 5 is attached to stabilizer 8 by a plurality of hinge means. Each elevator functions independently of the other.

The elevator control system is actuated by fore and aft motion of either the captain's or first officer's control columns indicated at 9 and 10, respectively. Control columns 9 and 10 are interconnected at 11 and each has an elevator forward control quadrant 12 and a pair of elevator cables running aft to an elevator aft control quadrant assembly 13 located in the top of vertical stabilizer 14. A linkage system generally indicated at 15 (see FIG. 2) interconnects aft control quadrant assembly 13 with elevator control units 6. The control units 6 for each elevator 5 are attached to the stabilizer 8 rear spar 16 and to the front spar 17 of the elevator (see FIG. 3.).

Each elevator 5 is provided with a control tab 18 which provides the aerodynamic force required to move the elevators during manual operation of the elevator control system upon failure of the power system. During normal power operation tabs 18 provide a small amount of assist to the powered elevator movement because the tabs are programmed to approximately zero hinge moment. Fore and aft movement of either of control columns 9 and 10 causes up and down rotation of the control tabs 18 in the power off mode of operation. Control tabs 18 are attached to the rear spar of their respective elevator. Control units 6 include mechanism for moving control tabs 18, the details thereof being described hereinafter, such mechanism functioning to lock out the control tabs during normal operation and free the tabs upon failure of the normal power system to aerodynamically assist the manual control of elevators 5.

Two elevator up cables (EU) and two elevator down cables (ED) provide a separate set of elevator connections for the pilot's and first officer's columns 9 and 10. As set forth above, these cables provide the connection from the forward control quadrants 12 in the lower nose section of fuselage 1 to the aft control quadrant assembly 13 near the top of vertical stabilizer 14. As shown in FIG. 1, the captain's cables EU and ED are located on the left side of the aircraft and are routed upwards near the vertical stabilizer front spar to aft control quadrant assembly 13 while the first officer's cables EU and ED are located on the right side of the aircraft and are routed upwards near the vertical stabilizer rear spar. Aft movement of control column 9 or 10 moves the elevator down (ED) cables aft and the elevator up (EU) cables forward. The ED cables connect to the forward control quadrant 12 and to the right sector of aft control quadrant assembly 13 while the EU cables connect to the forward control quadrant and to the left sector of aft control quadrant assembly 13 (see FIG. 2).

Figure 2:
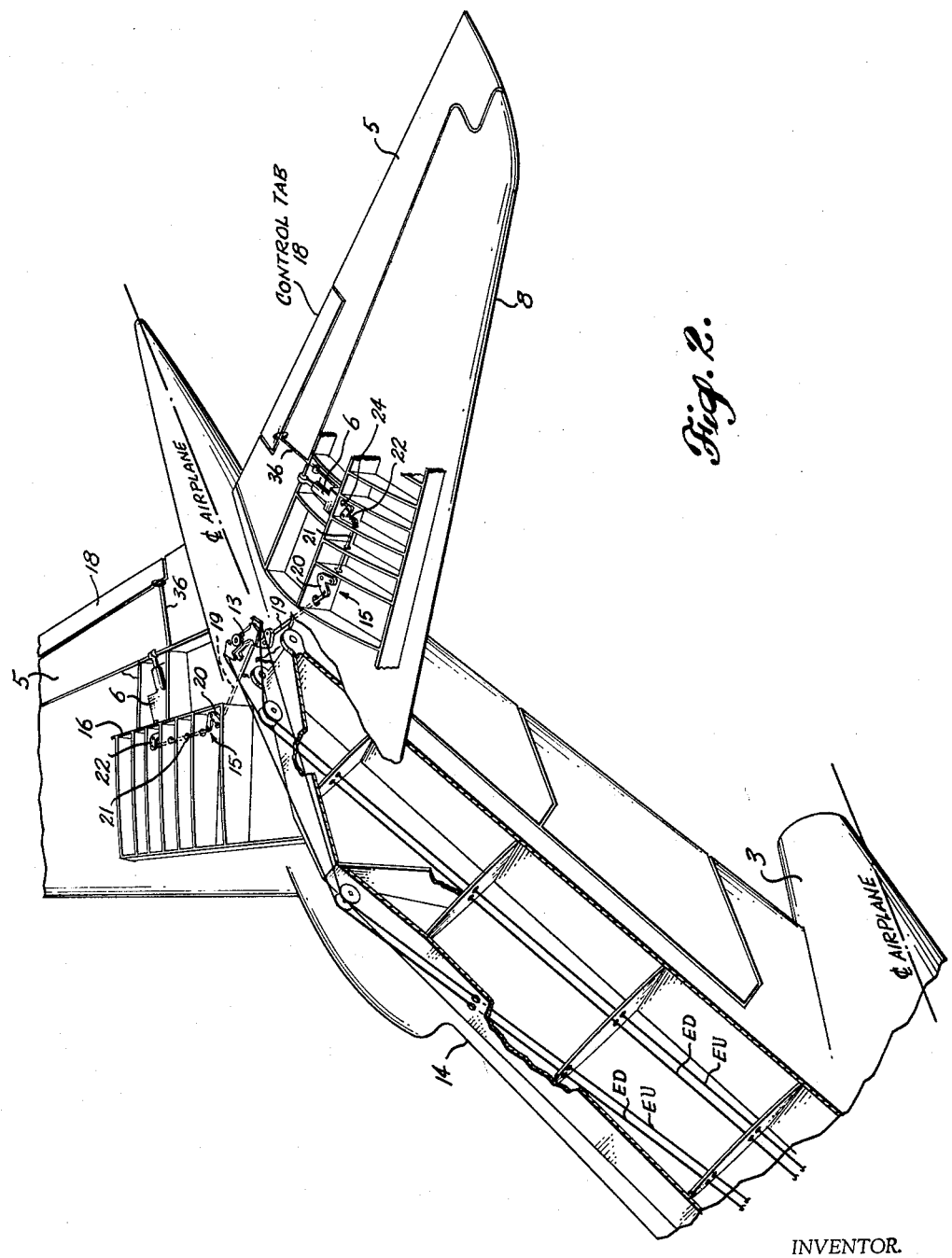
FIG. 2 is an enlarged view of the tail section of the FIG. 1 aircraft with parts cut away to show the elevator and tab control mechanism.

As shown in FIG. 2, the elevator aft control quadrant assembly 13 is located in the aft upper vertical stabilizer 14. Assembly 13 consists of two quadrants bolted together each with segments and is attached to a vertical torque tube which transmits rotation of the aft control quadrant to the elevator control linkages 15. The left and right linkages 15 each consists of an adjustable inboard control rod 19 interconnecting the crank of the aft control quadrant assembly with an inboard crank 20 pivotally mounted on the stabilizer rear spar 16, an outboard control rod 21 interconnecting the inboard crank 20 with an outboard crank 22 pivotally mounted on stabilizer rear spar 16 by rigging pin 23 (see FIG. 3), and an adjustable input rod 24 interconnecting outboard crank 22 with elevator control unit 6. Thus, rotation of aft control quadrant assembly 13 actuates the control linkage 15, which provides input to the control unit 6.

The elevator power control units 6 provide power controlled actuation of each elevator 5 in response to manual signals received through the elevator control linkage 15 or in response to electrical signals received from the pitch channel of the autopilot system (not shown). Each control unit 6 receives power from two hydraulic systems and is designed so that failure of either hydraulic system will not reduce or impair its operational effectiveness. Control units 6 each incorporates a tandem main actuator, main control valve, tab lockout mechanism, bypass shuttles, auto-pilot control actuator, autopilot engage mechanism, autopilot transfer valve, autopilot shutoff valve, autopilot rate sensor, internal check valves, a thermal bleed valve and filters. The other components of the control units 6 consist of the levers and pushrods through which input and follow-up signals are transmitted to the main control valve.

Since this invention relates to the novel tab lockout mechanism which is incorporated in the elevator control unit 6, only that portion of the control unit essential to an understanding of the tab lockout mechanism and its operation is described and shown in detail. The main control valve of the control unit 6 is described and claimed in applicant's copending U.S. patent application Serial No. 291,682, filed July 1, 1963, entitled Fail Safe Servo Valve, and assigned to the same assignee.

Figure 3:
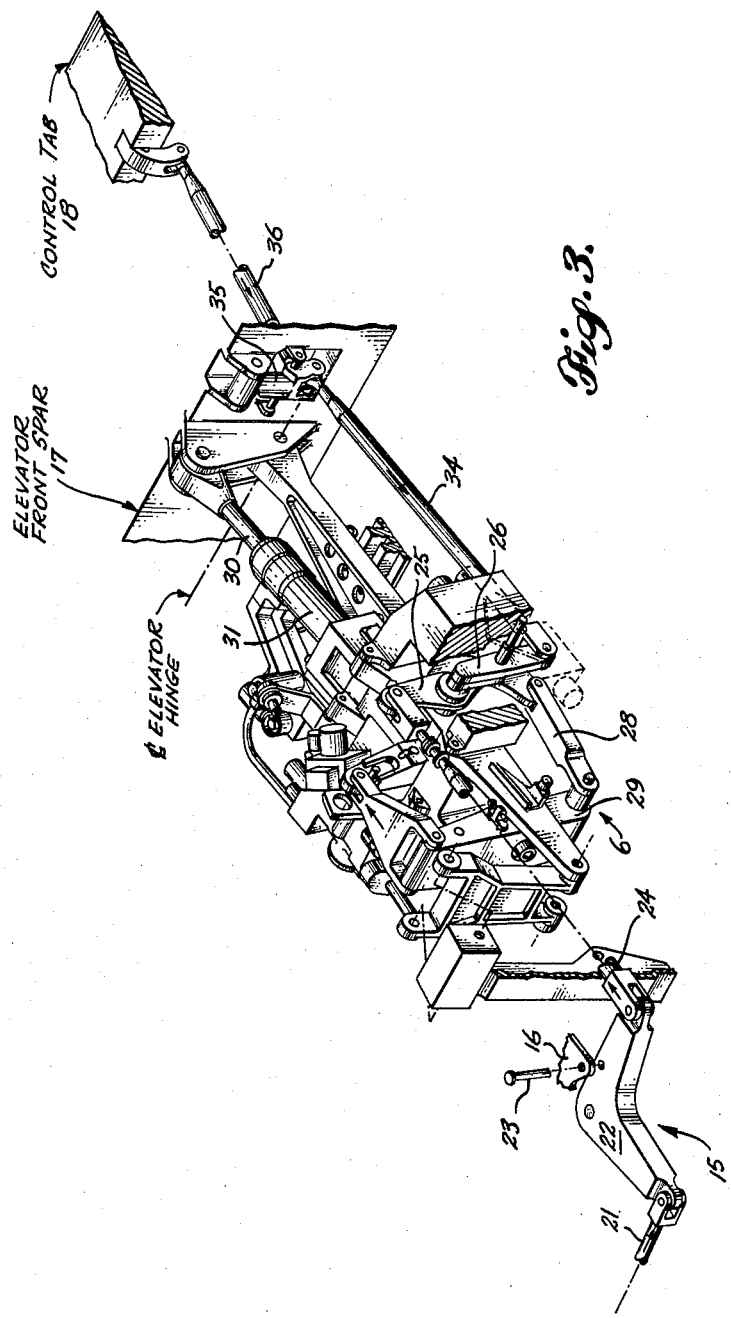
FIG. 3 is an enlarged detailed view of elevator and tab control mechanism of FIG. 2 with portions cut away for clarity.
Figure 4:
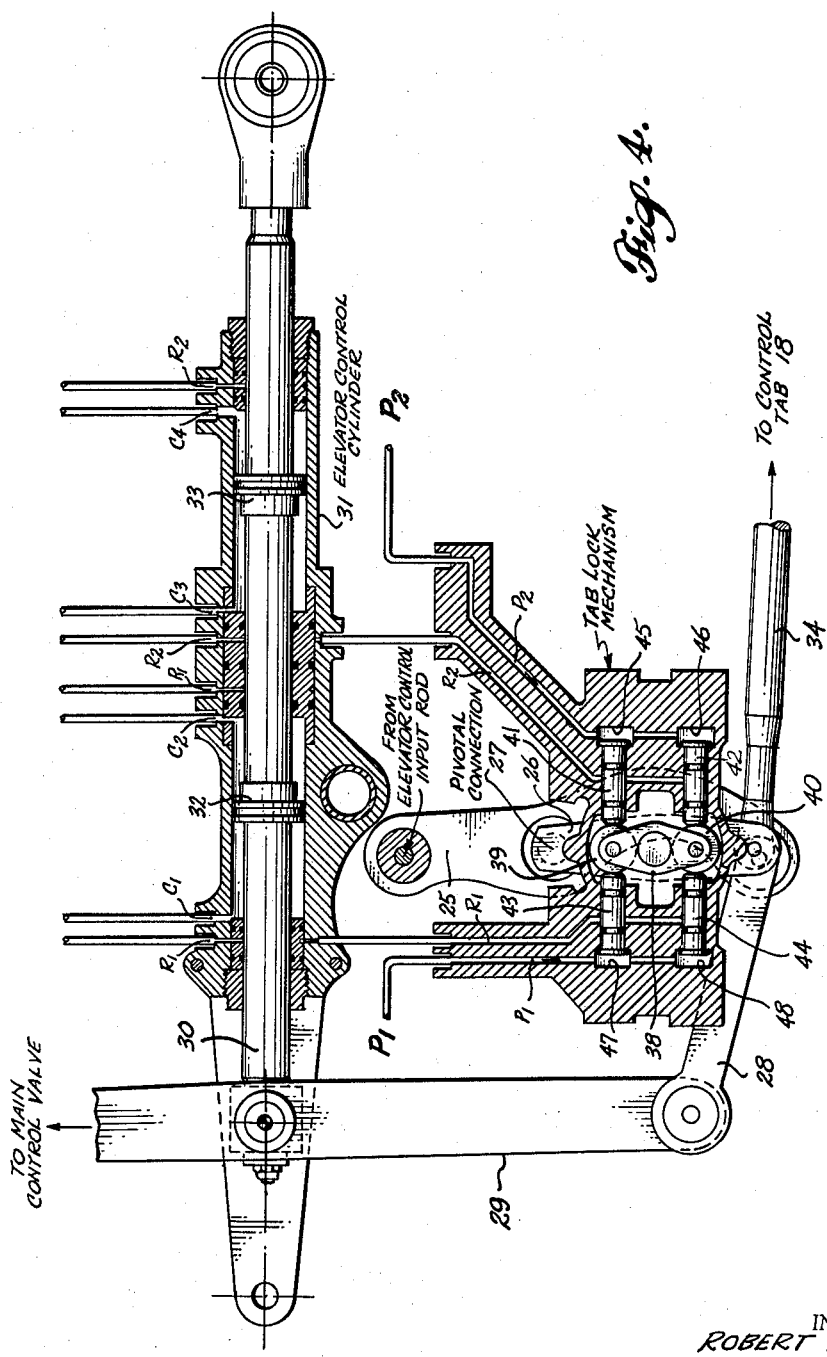
FIG. 4 is a schematic view of the FIG. 3 elevator and tab control mechanism showing the hydraulic circuit of the tab lock arrangement.

Referring now to FIGS. 3 and 4, adjustable input rod 24 of elevator control linkage 15 is operatively connected to a differential lever 25 which is pivotally mounted on a tab lockout lever 26 by pivotal connection 27 (see FIG. 4). The end of lever 25 opposite to the interconnection with input rod 24 is operatively connected to a rod 28 which in turn is connected to rod 29 which is pivotally mounted on the output shaft 30 of hydraulic cylinder 31, and interconnects with the main control valve (not shown). Hydraulic cylinder 31 actuates elevator 5 and is of the type described in the aforementioned application Serial No. 291,682 wherein output shaft 30 is provided with a pair of double acting power pistons 32 and 33 which are moved in the desired direction by fluid under pressure from a pair of pressure sources as controlled by the main control valve of the control unit 6. The ports $C_1$–$C_2$ and $C_3$–$C_4$ indicate the supply and return connections between cylinder 31 and the main control valve (not shown). Ports $R_1$ and $R_2$ indicate drain ports connected with the main control valve reservoir (not shown).

The end of tab lockout lever 26 opposite the pivotal connection 27 is operatively connected with a forward tab control rod 34 which is operatively attached to an idler link 35 mounted on elevator front spar 17. An aft tab control rod 36 is attached to idler link 35 (see FIG. 3), said aft tab control rod 36 being operatively attached to control tab 18.

As shown in FIG. 4, the tab lock mechanism consists of a lever 38 mounted on the same shaft as tab lockout lever 26, lever 38 being provided with a pair of rollers 39 and 40, one such roller being mounted at each end thereof. Two pairs of pistons 41–42 and 43–44 are mounted in cylinders 45, 46, 47, and 48, respectively. Pistons 41 and 43 are positioned on opposite sides of roller 39 while pistons 42 and 44 are positioned on opposite sides of roller 40. The housing is provided with passageways $P_1$–$P_2$ and $R_1$–$R_2$. Passageway $P_1$ directs pressure fluid from source $P_1$ to pistons 43 and 44 while passageway $P_2$ directs pressure fluid from source $P_2$ to pistons 41 and 42. Passageways $R_1$ and $R_2$ function as drains from the tab lock mechanism to fluid reservoirs (not shown). The tab lock mechanism, as set forth above, is incorporated in elevator control unit 6 as shown in FIG. 3.

Figure 5:
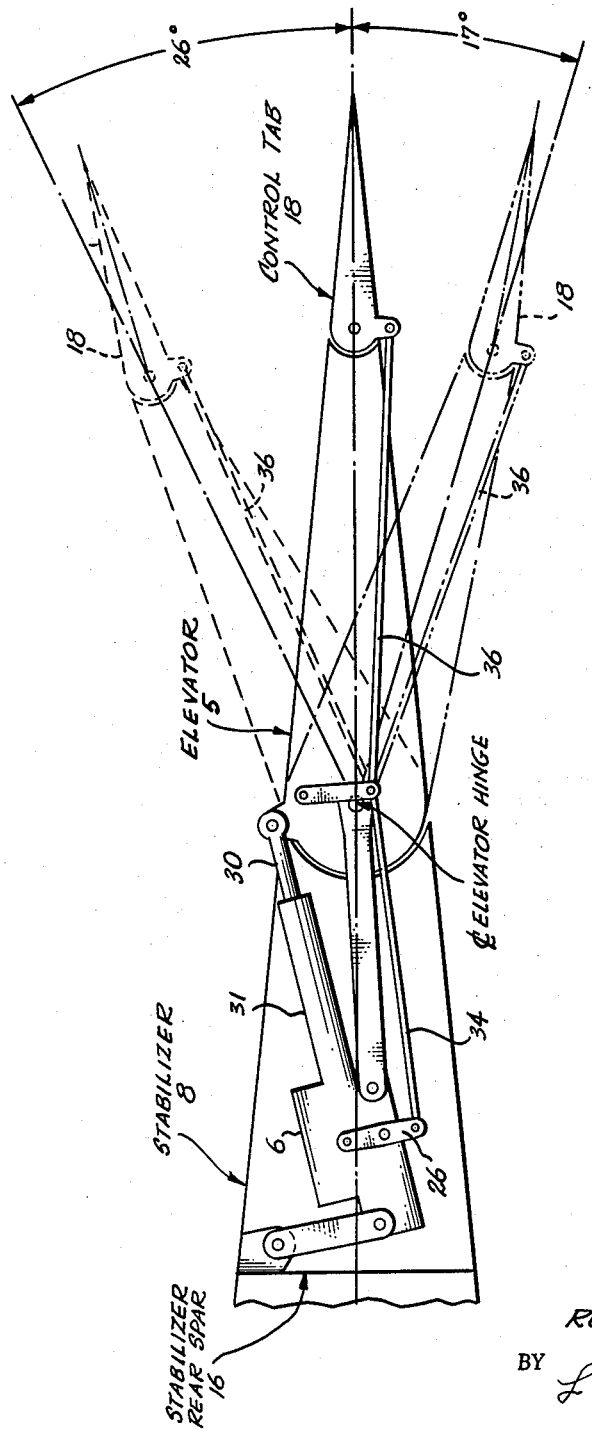

From the foregoing description of FIG. 4, it is readily apparent that under normal operating conditions pressure fluid from source $P_1$ and/or $P_2$ holds pistons 41–44 against rollers 39 and 40 which locks lever 26 against rotation when input rod 24 moves differential lever 25, thereby hydraulically locking movement of lever 26 and tab control rod 34. This action causes the tabs to lag behind the elevator movement. The "power-on" operation of elevator 5 and control tab 18 is clearly shown in FIG. 5.

In the event of hydraulic system failure of either hydraulic system $P_1$ or $P_2$ normal powered operation of the elevator control system will be retained.

In the event of hydraulic system failure of both hydraulic systems $P_1$ and $P_2$ a manual reversion will ensue. In the manual reversion mode the elevators 5 are actuated by aerodynamic action of the elevator control tabs 18. The fore and aft operation of the pilot's or first officer's control columns 9 or 10 provides normal operation of the elevator control linkage 15 to the elevator control unit 6. With loss of hydraulic pressure against pistons 41–44 the tab lock lever 26 is released and the elevator control tab 18 is displaced by the elevator control system to provide an aerodynamic force to displace elevator 5. As the elevator is displaced from neutral, air pressure differential in the balance chamber of balance panels (not shown) assist the control tab by reducing the forces required. During manual reversion operation the maximum surface deflections are limited to approximately 16° up elevator and 10° down elevator. The "power-off" operation of elevator 5 and control tab 18 is clearly shown in FIG. 6.

It has thus been shown that the invention provides an elevator tab control system which includes a hydraulic lockout during normal power operation with automatic reversion to manual control upon failure of the power system to assist in movement of the elevators.

While the invention has been described as relating to an elevator tab control arrangement, the principle set forth herein can be applied to any control surface utilzing tabs or flaps as an assist.

Although a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What I claim is:

1. In an aircraft having a control surface and a control tab associated with said control surface, a control surface mechanism comprising: power means for normally moving said control surface, means for moving said control tab, said control tab moving means being normally locked out of action by said power means, said control tab moving means including means for manually moving said control tab upon failure of said power means, whereby movement of said control tab aerodynamically assists in manual movement of said control surface.

2. The apparatus defined in claim 1 wherein said power means includes at least one hydraulic system, and wherein said control tab moving means is normally hydraulically locked out of action by piston means.

3. The apparatus defined in claim 1 wherin said control surface mechanism includes a differential lever means pivotally connected to said control tab moving means, whereby failure of said power means causes a different movement of said differential lever means with respect to said control tab moving means than the normal movement therebetween.

4. In an aircraft having a fuselage, wings, a tail section, propelling means, a plurality of control surfaces, and control tabs operatively associated with certain of said control surfaces; a control mechanism for said certain of said control surfaces comprising: power means for normally operating each of said certain of said control surfaces, manual means for actuating said power means, means operatively associated with said manual means and said power means for locking said control tab associated with said control surface out of action during power operated conditions, and means for releasing said locking means upon failure of said power means, whereby movement of said manual means actuates said control tab to aerodynamically assist in movement of said control surface.

5. The apparatus defined in claim 4 wherein said power means includes a hydraulic cylinder having double acting pistons therein and a plurality of fluid pressure sources adapted to supply pressure fluid to said cylinder.

6. The apparatus defined in claim 4 wherein said locking means includes at least two fluid actuated pistons, and wherein said power means normally supplies fluid to said pistons.

7. The apparatus defined in claim 6 wherein said power means includes a plurality of fluid pressure sources.

8. The apparatus defined in claim 4 wherein said locking means includes a differential lever means operatively connected to said manual means and said control tab, said differential lever means being normally locked out of action by said power means.

9. In an aircraft having control surfaces, control tab means operatively associated with at least one of said control surfaces, control means for normally actuating said control surface by power means, said control means including locking means for normally locking said control tab means out of action by said power means, said control means including means for actuating said control tab means upon failure of said power means to aerodynamically assist in moving said control surface.

10. The apparatus defined in claim 9 wherein said locking means includes a differential lever means and at least one piston means actuated by said power means and adapted to lock said differential lever means out of action during normal operating conditions.

11. A control mechanism for controlling a tab associated with an aerodynamic control surface comprising: means for locking said tab out of action during normal actuation of said control surface by power means, said locking means including means for moving said tab manually upon failure of said power means to aerodynamically assist in moving said control surface.

12. The control mechanism defined in claim 11 wherein said locking means includes a differential lever and a plurality of fluid actuated pistons which are normally held against said lever by pressure fluid of said power means.

13. The control mechanism defined in claim 11 wherein said locking means includes two sets of hydraulically actuated pistons, and wherein said power means includes two separate sources of hydraulic pressure, whereby hydraulic pressure from either of said sources acting against one of said sets of pistons maintains said tab locked out of action.

References Cited in the file of this patent
UNITED STATES PATENTS
2,669,401    Bosserman _____ Feb. 16, 1954